United States Patent
Tagra et al.

(10) Patent No.: US 10,719,665 B2
(45) Date of Patent: *Jul. 21, 2020

(54) UNSUPERVISED NEURAL BASED HYBRID MODEL FOR SENTIMENT ANALYSIS OF WEB/MOBILE APPLICATION USING PUBLIC DATA SOURCES

(71) Applicant: International Business Machines Corporation, Armonk, NY (US)

(72) Inventors: Ankur Tagra, Bangalore (IN); Rajat Verma, Bangalore (IN); Sudarshan Narayanan, Bangalore (IN)

(73) Assignee: International Business Machines Corporation

(*) Notice: Subject to any disclaimer, the term of this patent is extended or adjusted under 35 U.S.C. 154(b) by 0 days.

This patent is subject to a terminal disclaimer.

(21) Appl. No.: 16/411,674

(22) Filed: May 14, 2019

(65) Prior Publication Data
US 2019/0266245 A1  Aug. 29, 2019

Related U.S. Application Data

(63) Continuation of application No. 15/849,946, filed on Dec. 21, 2017, now Pat. No. 10,394,959.

(51) Int. Cl.
*G06F 40/30* (2020.01)
*G06N 3/08* (2006.01)
(Continued)

(52) U.S. Cl.
CPC .......... *G06F 40/30* (2020.01); *G06F 40/117* (2020.01); *G06F 40/14* (2020.01); *G06F 40/284* (2020.01); *G06N 3/088* (2013.01)

(58) Field of Classification Search
CPC .......... G06F 17/2785; G06F 17/2247; G06F 17/277; G06F 17/218; G06N 3/088
See application file for complete search history.

(56) References Cited

U.S. PATENT DOCUMENTS 8,380,489 B1  2/2013 Zhang
8,554,701 B1  10/2013 Dillard et al.
(Continued)

FOREIGN PATENT DOCUMENTS

CN  105930503 A  9/2016
CN  105447206 B  4/2017
(Continued)

OTHER PUBLICATIONS

"1.4. Support Vector Machines", scikit-learn developers, http://scikit-learn.org/stable/modules/svm.html#svm }, Accessed on Dec. 20, 2017, 16 pages.
(Continued)

*Primary Examiner* — Stella L. Woo
(74) *Attorney, Agent, or Firm* — Scully, Scott, Murphy & Presser, P.C.; Scott S. Dobson

(57) ABSTRACT

Machine training for determining sentiments in social network communications. A text document is extracted from a web site and tokenized into tokens. The tokens are input to a word to vector conversion model to generate word vectors. A term frequency inverse document frequency (TF-IDF) algorithm converts the word vectors to sentence vectors. A randomly selected subset the sentence vectors are tagged and used to train a classifier. The classifier takes a sentence vector and predicts a sentiment associated with the sentence vector. Predicted sentiment associated with each of the sentence vectors may be combined to generate a sentiment associated with the text document.

18 Claims, 7 Drawing Sheets

(51) Int. Cl.
*G06F 40/14* (2020.01)
*G06F 40/117* (2020.01)
*G06F 40/284* (2020.01)

(56) References Cited

U.S. PATENT DOCUMENTS

| | | | |
|---|---|---|---|
| 9,336,192 B1 | 5/2016 | Barba et al. | |
| 10,394,959 B2* | 8/2019 | Tagra | G06F 17/2785 |
| 2011/0184729 A1 | 7/2011 | Nam | |
| 2013/0103623 A1 | 4/2013 | Burstein et al. | |
| 2017/0169008 A1 | 6/2017 | Kang | |
| 2018/0365248 A1* | 12/2018 | Zheng | G06F 17/28 |
| 2019/0188277 A1* | 6/2019 | Mansar | G06N 5/003 |

FOREIGN PATENT DOCUMENTS

| | | |
|---|---|---|
| CN | 106569996 A | 4/2017 |
| CN | 106844632 A | 6/2017 |

OTHER PUBLICATIONS

List of IBM Patents or Patent Applications Treated as Related, dated May 14, 2019, 2 pages.

* cited by examiner

UNSUPERVISED NEURAL BASED HYBRID MODEL FOR SENTIMENT ANALYSIS OF WEB/MOBILE APPLICATION USING PUBLIC DATA SOURCES

FIELD

The present application relates generally to computers and computer applications, and more particularly to automated machine trained to learn and/or understand sentiments expressed in data such as social network communication data.

BACKGROUND

In social media, data can be generated in the form of text, audio and video data. This data may be useful, for example, for service providers as the data may possess hidden information such as information about user satisfaction, user issues, popularity and statistical information about number of affected customers. Often this data is not analyzed, or when analyzed, may not reflect accurate sentiments conveyed in the data.

In currently existing solutions, for example, World Wide Web (web) or mobile applications, sentiment analysis may be performed using various natural language processing (NLP) techniques, which have sentiment word libraries or dictionary defined. These techniques have a static score that is automatically assigned to each word and combining the static scores of the words determines a sentiment for the whole sentence.

BRIEF SUMMARY

A machine trained method and system of determining sentiments in social network communications may be provided. The method, in one aspect, may include extracting a text document from a web site. The method may also include tokenizing the text document into tokens. The method may further include inputting the tokens to a word to vector conversion model and running the word to vector conversion model to generate word vectors. The method may also include inputting the word vectors to a term frequency inverse document frequency (TF-IDF) algorithm to generate sentence vectors. The method may further include randomly selecting a subset of the sentence vectors for tagging with sentiment labels. The method may also include training via machine learning a classifier based on the subset of sentence vectors that are tagged. The method may further include running the classifier with the sentence vectors as input to predict a sentiment associated with each of the sentence vectors. The method may also include combining the predicted sentiment associated with said each of the sentence vectors to generate a sentiment associated with the text document.

A machine trained system that determines sentiments in social network communications, in one aspect, may include a hardware processor and a memory device coupled to the hardware processor. The hardware processor may be operable to perform: extracting a text document from a web site; tokenizing the text document into tokens; inputting the tokens to a word to vector conversion model and running the word to vector conversion model to generate word vectors; inputting the word vectors to a term frequency inverse document frequency (TF-IDF) algorithm to generate sentence vectors; randomly selecting a subset of the sentence vectors for tagging with sentiment labels; training via machine learning a classifier based on the subset of sentence vectors that are tagged; running the classifier with the sentence vectors as input to predict a sentiment associated with each of the sentence vectors; and combining the predicted sentiment associated with said each of the sentence vectors to generate a sentiment associated with the text document.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
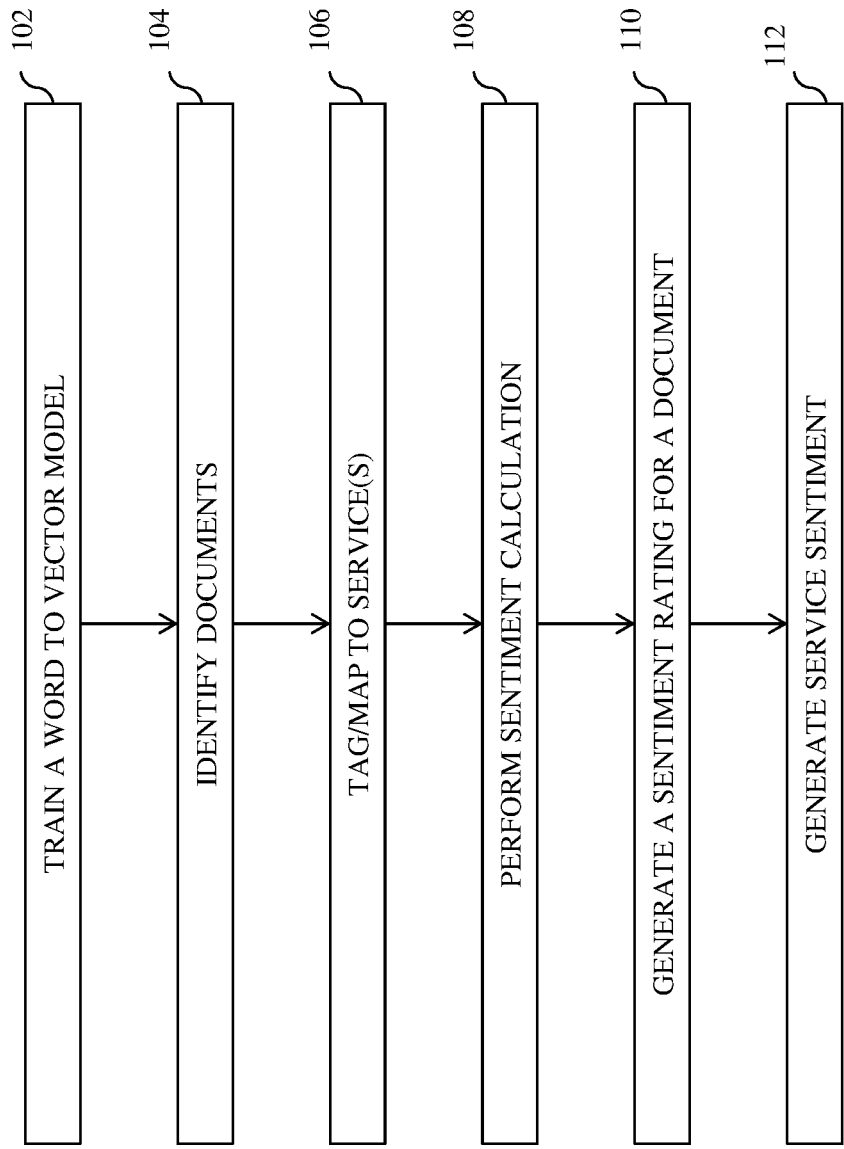
FIG. 1 is a flow diagram showing a method of the present disclosure in one embodiment.

A system, method and techniques are presented for a web or mobile application or the like that performs sentiment analysis, for example, using public data sources. The methodologies of the present disclosure may automate a machine, by training the machine to automatically be able to analyze text data or document and predict sentiments, for example, expressed in a text document or data. Training a machine to be able to recognize sentiment conveyed in a text document or data improves the machine and/or machine to human interface. For instance, an automatic machine is rendered to more accurately understand the expressions or sentiments documented in the text.

In a use case scenario as an example, in which a service provider is providing a service to a user, and the user is connected to the service provider's computer system or application (e.g., web application or mobile application, e.g., via a network such as the Internet, World Wide Web or another network), there may exist a context mismatch between the service provider and user. To bridge the gap a service provider needs to understand the requirements of the user. With the abundance of data being generated on the web continuously, there is no easy way for the web application to analyze the data and determine a conclusion. The system, method and techniques of the present disclosure in one embodiment disclose a solution, for example, for a web or mobile application for determining useful insights into user needs by automatically analyzing the sentiment of user(s) in form of text document. With useful insights, the service provider is able to improve the service provider's system.

The present disclosure, in one aspect, provides for analyzing data, for example, given text data and predicting its sentiment, which for example, can be used for various indexes like popularity index prediction and satisfaction index prediction, and provide improvements in service.

In one embodiment, the system and method of the present disclosure may capture the linguistic regularities in data, learn word representations to better understand relation between words (learn efficient representation of words) and identify junk sentences and successfully remove them from context.

Linguistic regularities improve the way the text is analyzed by capturing the linguistic regularities between the words; For example, vector(AWS)−vector(EC2)+vector (GCE) is similar to vector(GCP). Amazon™ Web Services (AWS) refers to a service provider, Amazon™ Elastic compute Cloud (EC2) refers to a service, GCP is an acronym for Google™ Cloud Platform (GCP), and GCE is an acronym for Google™ Compute Engine. The relation that EC2 holds with AWS is similar to the relationship which GCE holds with GCP as computed by the algorithm shown as Step 0 below.

Learning efficient representation of words refers to an algorithm that helps in improvising the word representation based on the mapping that the algorithm finds out for a specific word provided to it. The algorithm also relates to the synonyms and antonyms to derive better word relation so that when the sentiment analysis is run it provides better weightage for these words.

Current technique for learning efficient representation of words includes Natural Language Toolkit (NLTK. In this toolkit, a sentiment score is obtained for each dictionary word in a sentence and an average is taken of the sentence containing the words.

An example is described below.
I AM HAPPY WITH YOU
I AM SAD WITH YOU

The words in the above example sentences have the following scores respectively:
I: 3.5, AM: 4, HAPPY: 4.2, WITH: 3.4, YOU: 3.6 and SAD: 1.6

The average obtained for first sentence is: 3.74 ((3.5+4+4.2+3.4+3.6)/5).

The average obtained for the second sentence is: 3.22 ((3.5+4+4.2+3.4+1.6)/5).

Looking at the two averages show that sentence 1 and 2 are similar as the standard deviation between these two sentences is small. But semantically, these two sentences are in fact exactly opposite in their meaning.

The system and method of the present disclosure in one embodiment uses the above relations in deriving better representation of the words, and provides advantage and accuracy in deriving the sentiment out of the given sentence, for instance, posted on a social network or media web page. Such approach helps in achieving more accurate classification of the sentence to positive, negative or neutral.

The system and method of the present disclosure in one embodiment, based on the calculation, takes a 3-dimensional representation (positive, negative, neutral), and computes:
Happy: {1, 0, 2}
Sad: {3, −1, 0}

According to the above calculation, the words 'Happy' and 'Sad' fall in different dimensional spheres. Creating their sentence vectors with the above calculation will move the sentences into different clusters indicating different meanings altogether.

An embodiment of the system and method of the present disclosure improves performing sentiment analysis. An algorithm that performs a sentiment analysis in one embodiment may include the following processing or steps with an additional processing or step that acts as a preprocessing task irrespective of the data context given.

In the present disclosure, the following terminologies are used.

Service Provider is a vendor who provides services to offer on the web. Data is generated about the vendor on the Internet and may be analyzed. Examples of an existing service provider may include, but are not limited to: AMAZON™ Web services, MICROSOFT™ Azure, GOOGLE™ Cloud Platform, SOFTLAYER™, and others.

A Service is a service that is offered by the service provider. Users directly use these services and provide or post their review comments, for example, in a form of blogs, social media and customer report forums, or another. Examples of a service may include, but not limited to: EC2, AMAZON™'s Simple Storage Service (S3), GCE, and others.

FIG. 1 is a flow diagram showing a method of the present disclosure in one embodiment. At 102, preprocessing of training a word to vector model is performed. A word to vector model takes a corpus of text as input and produces a vector space, with a word in the corpus assigned a vector space as output, for example for each word in the corpus.

A preprocessing step or algorithm in one embodiment includes training a word to vector conversion model. This preprocessing step or algorithm, for example, may train a word to vector conversion model on standard benchmark 1-billion-word dataset. The model after training converts words into its "n" dimensional vector representations, where the value of "n" can be tuned.

In one embodiment, this model is based on distribution hypothesis which states that words that appear in the same contexts share semantic meaning. For instance, the word2vec tool takes a text corpus as input and produces the word vectors as output. It first constructs a vocabulary from the training text data and then learns vector representation of words. In one embodiment, the preprocessing algorithm uses continuous bag of words (CBOW) technique. Word vectors also capture linguistic regularities which are used in identifying the related words.

In one embodiment, a classifier is trained for positive, negative and neutral sentences. Input data for training may be obtained from sources such as publicly available websites such as Wikipedia data.

Figure 2:
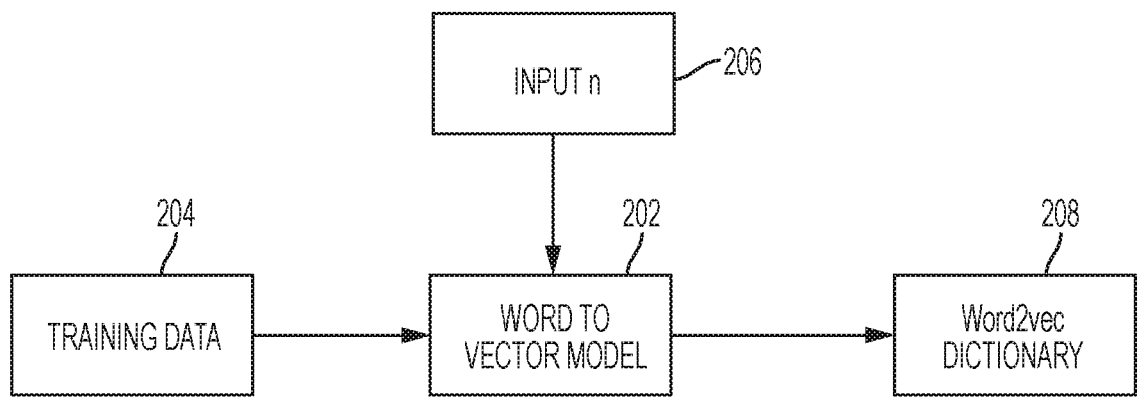
FIG. 2 shows a block diagram in one embodiment illustrating training of a word to vector model.

FIG. 2 shows a block diagram in one embodiment illustrating training of a word to vector model. The components may be executed in a computer processor, for example, a hardware processor may perform the functions of the components. A word to vector model 202 is trained based on input training data 204 and input number n 206 that specifies the number of dimensions. The word to vector model outputs a dictionary 208 of words assigned a vector representation. The word to vector model in one embodiment is a neural based model, which takes text data as input and produces n-dimensional numeric representations based on semantic relation between words.

Referring to FIG. 1, at 104, relevant documents are identified. In one embodiment, relevance is directly proportional to weightage, calculation of which in one embodiment is described below. The method in one embodiment may take a threshold value of relevant documents. This step, in one embodiment, includes extracting relevant text documents from a web server or website or web source such as social media server or site, social network server or site, servers of blogs, and/or another online source, for example, accessed on a computer network. Those online text documents are used to train the word to vector model, in one embodiment. For instance, postings on a web page of a social network web site, blogging web site, and/or another may be extracted. A document can be an ordered collection of lines or paragraphs; a document can be a single comment, e.g., contain a single comment. Programming language libraries or functions such as Python libraries can be executed to extract such documents from a web page or web site, for example, to perform web scrapping.

The documents that are extracted are assigned a weightage or weight value. For instance, each document may be assigned a weightage or weight value. In one embodiment, the parameters used to assign weightage are as follows.

a) Time elapsed: weightage is inversely proportional to time elapsed (t) since the last access to the document. For instance, the source document is considered to get less accurate with passage of time according to current context.
b) Directly proportional to number of likes (l) of the document.
c) Directly proportional to number of shares (s) of the document.
d) Directly proportional to number of comments (c) posted about the document.
e) Directly proportional to number of retweets (r) posted on the document.

A weight or weightage (w) of a document may be determined as follows:

$$w = k \times (l \times s \times c \times r)/t$$

In the above computation, k is a constant.

Figure 3:
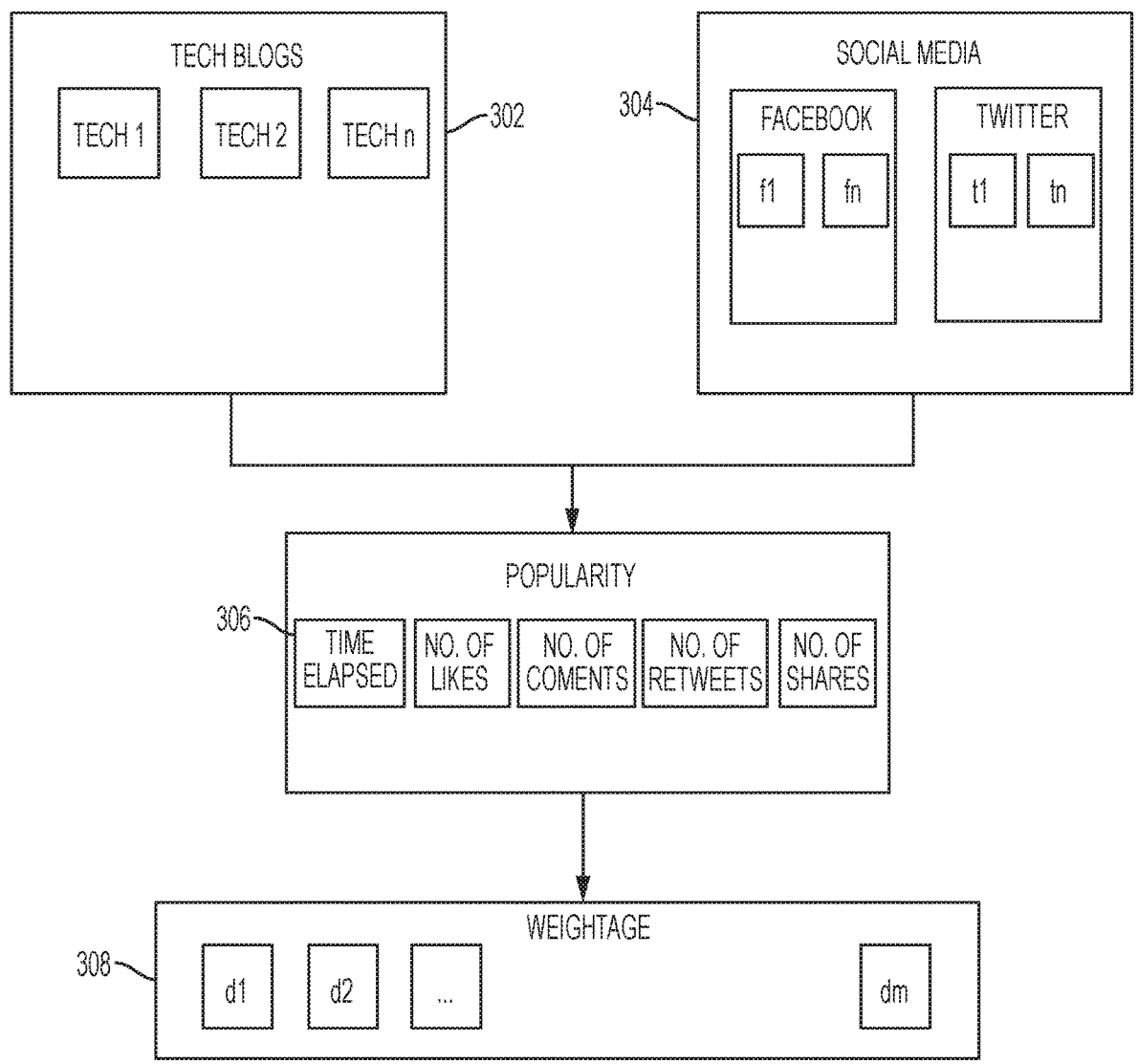
FIG. 3 is a block diagram illustrating assigning of weightage to documents in one embodiment.

FIG. 3 is a block diagram illustrating assigning of weightage to documents in one embodiment. The components may be executed in a computer processor, for example, a hardware processor may perform the functions of the components. A blog web site 302 (e.g., a technology blog) may include a number of blogs related to different technologies (e.g., Tech 1, Tech 2, Tech 3). A social media or social networking web sites (e.g., collectively shown at 304) may include comments and/or posts posted to those web sites. The system and/or method in one embodiment may determine popularity associated with those blogs, comments and/or posts as shown at 306, based on factors such as the time elapsed, number of likes, number of shares, number of comments, number of retweets, and/or other user action, other factor. As shown at 308, documents (e.g., extracted text from 302 and 304) are assigned weightage based on those factors.

Referring to FIG. 1, at 106, the extracted documents are tagged with or mapped to a service. The processing at 106 includes identifying relevant services in the document and assigning a relevance score to that service. In one embodiment, relevance of services may be calculated by comparing the common words related to a service with the input document across every service, for example, generating a score which is directly proportional to the number of word matches. Based on a threshold value relevance among documents is computed in one embodiment. For example, usage instances or occurrence of words that indicate a service (e.g., specific names of services) may be determined, and a relevance score may be determined based on the number of the times that usage appear in the document. In one embodiment a service or services whose relevance score is greater than alpha (a) may be selected for tagging the document. In one embodiment, a document can be assigned to (tagged with) multiple services. Alpha (a) may be a predetermined or a configurable value.

Figure 4:
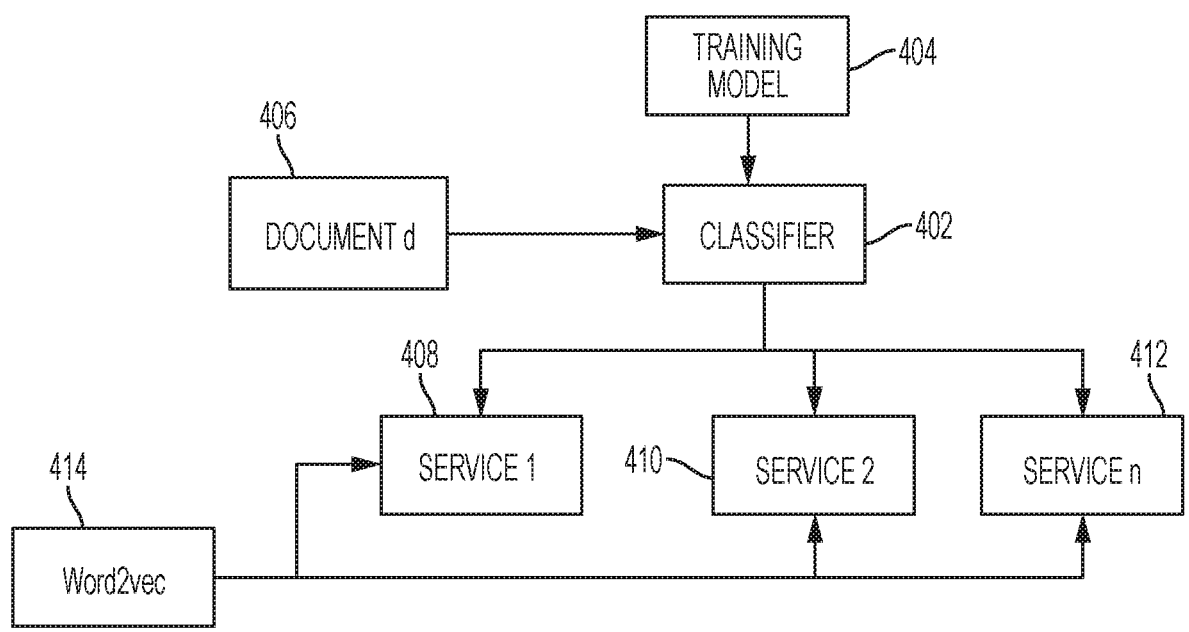
FIG. 4 is a block diagram illustrating tagging or mapping of services to documents in one embodiment.

FIG. 4 is a block diagram illustrating tagging or mapping of services to documents in one embodiment. The components may be stored in a memory device and executed in a computer processor, e.g., coupled to the memory device. For example, a hardware processor may perform the functions of one or more of the components. A classifier 402 that includes a trained model 404 receives as input a document 406, e.g., Document d, and classifies the document as being related to one or more services 408. 410, 412, e.g., service 1, service 2, service, e.g., based on word to vector model 414. Word2vec model 414 takes words and converts them into vector representations, which are used in classification.

At 108, sentiment calculation is performed. The processing at 108 takes each document d, and tokenizes it, and then passes it as an input to a word to vector conversion (described at 102), obtaining or generating the word vectors. An algorithm is used on the word vectors to obtain sentence vectors. For instance, term frequency inverse document frequency (TF-IDF) algorithm is used (e.g., executed on a computer processor) to obtain or generate sentence vectors. Word vectors are input to the TF-IDF algorithm, and IDF frequencies are computed from training documents, creating sentence vectors. TF is term frequency and IDF is inverse document frequency. A word vector is given weighted average and all the words vectors in the sentence are added to make a sentence vector. For example: words, TF, IDF in "Chocolate are bitter to taste, but chocolate helps reduce heart risks" are as follows:

Chocolate: v1, 2, 0.1;
are v2, 1, 0.4;
bitter: v3, 1, 0.3;
to: v4, 1, 0.25;
and so on.
TF-IDF: v1*2*0.1+v2*1*0.4+v3*1*0.3+v4*1*0.25.

The processing at 108 may also include taking random sentence subsets with their vectors and manually tagging them to train a classifier which will classify each sentence as positive, negative, neutral and junk. As an example, a linear supervised vector machine (SVM) may be used or implemented for classification, and the classifier may be trained on tagged dataset (e.g., relatively small). The processing at 108 may also apply the vector dataset (sentence vectors) on this classifier and classify each sentence as positive, negative, and neutral while separating out the junk sentences. In one embodiment, the processing at 108 assigns a score of positive, negative, neutral to each sentence out of 5. For example, score between 0 and 5 may be assigned, for instance, in a scale of 0 to 5.

Referring token FIG. 1, at 110, a sentiment rating for a document (e.g., out of 5) may be generated, for example, by computing the average of the scores of sentences.

In one embodiment, sentiment of a document (sentiment associated with a document, also referred to as document sentiment) may be determined as follows:

$$\text{Sentiment} = ((\text{positive}*(\text{number of positive}) + \text{neutral}*(\text{number of neutral}) + \text{negative}*(\text{number of negative})))/5$$

The above computation generates the sentiment of the document being analyzed out of 5, where 5 denotes being truly positive and 0 denotes truly negative.

Figure 5:
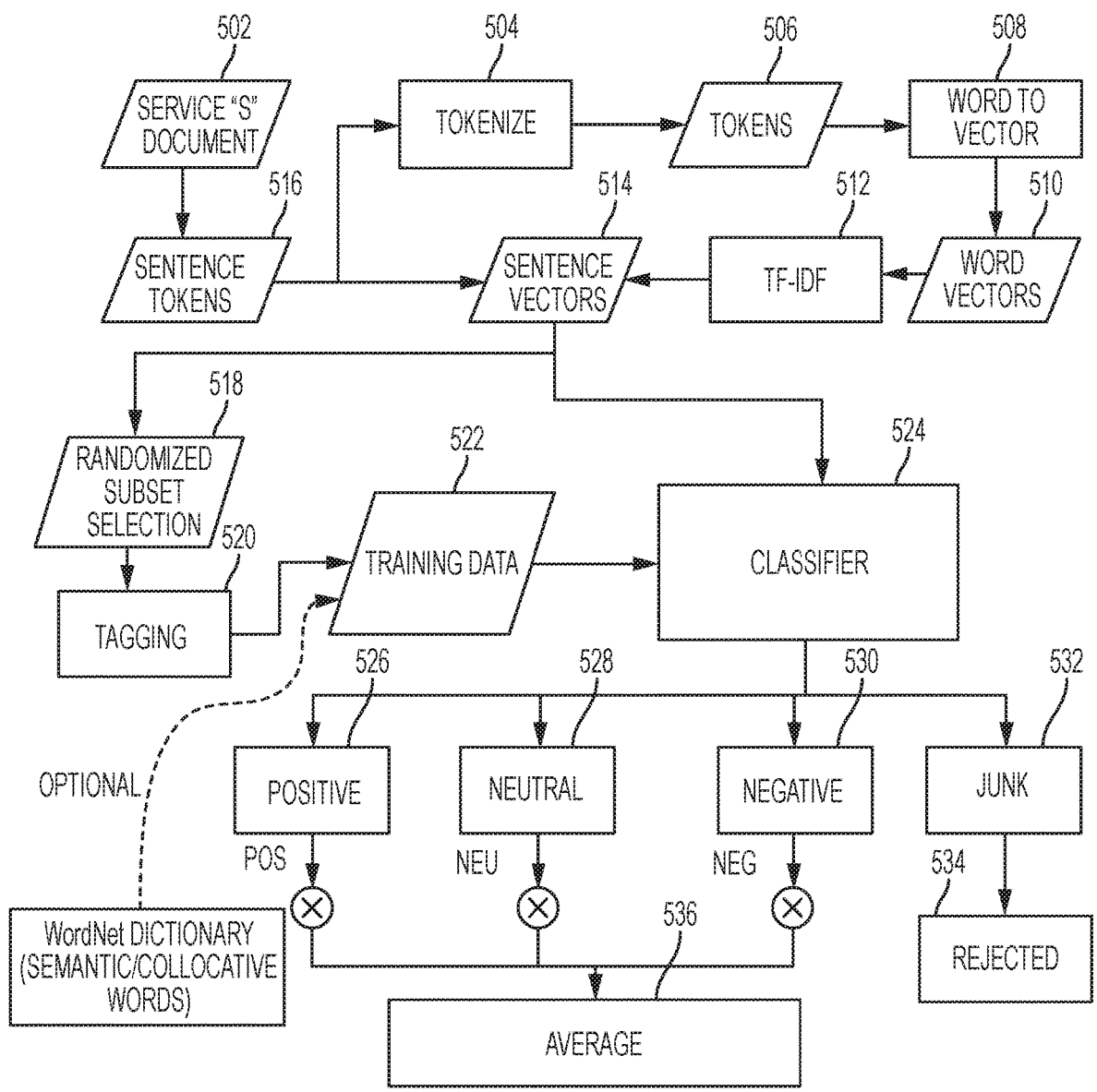
FIG. 5 is a block diagram illustrating sentiment calculation to a sentence vector in one embodiment.

FIG. 5 is a block diagram illustrating sentiment calculation to a sentence vector in one embodiment. The components may be stored in a memory device and executed in a computer processor, e.g., coupled to the memory device. For example, a hardware processor may perform the functions of one or more of the components. A document 502 may be tokenized at 504 into tokens 506. The tokens are input to word to vector model 508, which takes the tokens and converts them into word vectors 510. A TF-IDF algorithm 512 converts the word vectors 510 into sentence vectors 514. Token are words in a sentence, overall it is called sentence vector which is generated from word vectors using TF-IDF.

A subset 518 of the sentence vectors may be selected, for example, from the sentence vectors 514 as training data. The subset 518, for example, is chosen in random manner, or randomly, in one embodiment. The subset 518 of the sentence vectors are tagged at 520, for example, with labels, e.g., positive, neutral, negative, junk. Using the tagged or labeled subset of sentence vectors as training data 522, a classifier 524 is trained to predict a label given a test sentence, for example, by machine learning. The classifier 524 that is trained takes the sentence vectors 514 as input and predicts for each sentence vector its label (sentiment), for example, as positive 526, neutral 528, negative 530, or junk 532. A sentence vector predicted as junk is rejected at 534. At 536, the average label (sentiment) for the document is generated by computing an average of the sentence vector labels for all sentence vectors in the document.

Referring to FIG. 1, at 112, service sentiment (sentiment associated with a service) may be determined. Service sentiment in one embodiment may be determined as follows.

For each document d related to service "s", perform the processing of 110. Then, compute or generate the average of the rating or sentiment of the documents related to service "s" to determine service sentiment. For example, the sum of the sentiments of documents (related to a service) is divided by the number of the documents (related to the service) to determine the average of the rating or sentiment of the documents related to that service. The average represents the service sentiment.

Output:

Table 1 shows a sample example output of 4 documents. Table 1 shows that service 4 has the most positive sentiment among the users and document 4 is the most positively reviewed document.

TABLE 1

|  | Service 1 | Service 2 | Service 3 | Service 4 | Service m |
|---|---|---|---|---|---|
| Document 1 | 2.6 | — | 2.6 | — | — |
| Document 2 | — | 3.2 | — | — | — |
| Document 3 | — | 3.8 | — | 3.8 | 3.8 |
| Document 4 | 2.1 | — | 2.1 | — | 2.1 |
| Average rating | 2.35 | 3.5 | 2.35 | 3.8 | 2.95 |

Tuning

In one embodiment, the system and/or method may segregate or partition a document into a plurality of paragraphs or sections, in which few paragraphs may be relevant to service but many may not be. For instance, only few paragraphs may include text mentioning or describing a service. In this embodiment, the average relevance of the overall document for a particular service described may be determined. For instance, the average relevance may be determined by dividing the number of paragraphs that describe the service by the total number of paragraphs in the document. In one aspect, the system and/or method may consider only relevant documents and for computing relevance, the system and/or method may perform a keyword search. If keywords matched are greater than a threshold value (which may be configurable) than the paragraph is considered relevant. Taking average of all paragraph relevance, the system and/or method may calculate the document relevance. If the average relevance value (e.g., referred to as lambda) goes below a threshold level or value, then the document may be considered irrelevant. The threshold level may be predetermined and/or configurable. In this way, this embodiment may ignore sparsely populated sentiment documents.

The system and/or method in the present disclosure may be utilized, for example, in predicting quality of service ratings for various cloud vendors using their data present, for example, in the form of online technical blogs and/or online social network postings or comments. As another example, the system and/or method in the present disclosure may be utilized in restaurant ratings to obtain better quality of service related to the food and other amenities provided by the restaurant. Yet as another example, the system and/or method in the present disclosure may be utilized in predicting the likelihood of a customer visiting the restaurant. Still yet as another example, the system and/or method in the present disclosure may be utilized in determining or predicting public views on policies (e.g., government policies on education, and/or others). Online forums, for example, including online social network or social media platforms, and/or media data may be analyzed to determine the quality of service rating for a policy.

Consider an example of two sentences using n dimensional representation (n=2):
1. Food tastes awesome
2. Food tastes terrible Analyzing these sentences based on vectors and calculating efficiency of their vector representation, for example, based on cosine similarity and Jaccard similarity produces the following.
1. word vector approach:
Cosine similarity: 0.93
Jaccard similarity: 0.67
The above approach indicates that these two sentences have similar sentiment, but otherwise is true. Briefly, high cosine similarity (and also Jaccard similarity) indicates that sentiment 1 and sentiment 2 are similar. But, the actual meaning of the sentences 1 and 2 are opposite.
2. sentence vector approach:
Cosine similarity: 0.61
Jaccard similarity: 0.34
The sentence vector approach provided in the system and/or method in the present disclosure, as shown above, shows that these sentences are opposite in nature, which is true. Low value of cosine similarity (and also Jaccard similarity) in the sentence vector approach indicates the sentences are not similar.

The system and/or method in the present disclosure in one embodiment combines the data sentiment information collected from word2vec and TF-IDF to arrive at a more qualitative analysis. Sentiment analysis may be performed for social media data (e.g., blogs, reviews, feedback, comments, e.g., posted online on a social network or media platform) using word2vec (or concept vectors). The system and/or method in one embodiment may understand relations between words to derive sentiment of a given sentence and classify the given sentence as positive, negative or neutral. The system and/or method in one embodiment may also train a word2vec (word to vector) tool or model using the social media data and enable the word2vec model to convert words into "n" dimensional vector where "n" can be tuned. The system and/or method in one embodiment may also extracting documents from social media (or web sources) and assign weights to the documents based on elapsed time, number of likes and/or dislikes, number of retweets (e.g., forwarding a message or comment from another user, e.g., with attribution to a poster who first posted it) and/or shares, and determine sentiment score for various services offered by a service provider based on sentiments derived from the documents corresponding to various services.

The system and/or method of the present disclosure in one embodiment may tune the "n" dimension based on the data set size and efficiency of vectors obtained. Tuning includes selecting only relevant documents for analysis by generating their relevance scores as described above and pruning (omitting or deleting) the irrelevant documents from consideration.

The system and/or method of the present disclosure in one embodiment may identify service based on linguistic regularities, and calculate sentiment based on weighted documents as identified by elapsed time, number of likes (e.g., indication of approval for a post) and/or dislikes (e.g., indication of disapproval of a post), number of retweets, and/or others. In one aspect, a word2vec tool or model (with its feature linguistic detection capability) along with TF-IDF may be used or executed to obtain sentence vectors. The word2vec tool takes a text corpus as input and produces word vectors as output. In one embodiment, the system and/or method in the present disclosure may perform or use hybrid unsupervised neural (HUN) learning to create a sentence vector (e.g., hybrid unsupervised neural (HUN) based sentiment analysis on text data), provide overall document weightage, and use Continuous Bag of Words (CBOW) model, a vector space model. The vector representations in the present disclosure capture or identify linguistic regularity. In one embodiment, the system and/or method in the present disclosure may handle classification of junk sentences to derive better classification.

Figure 6:
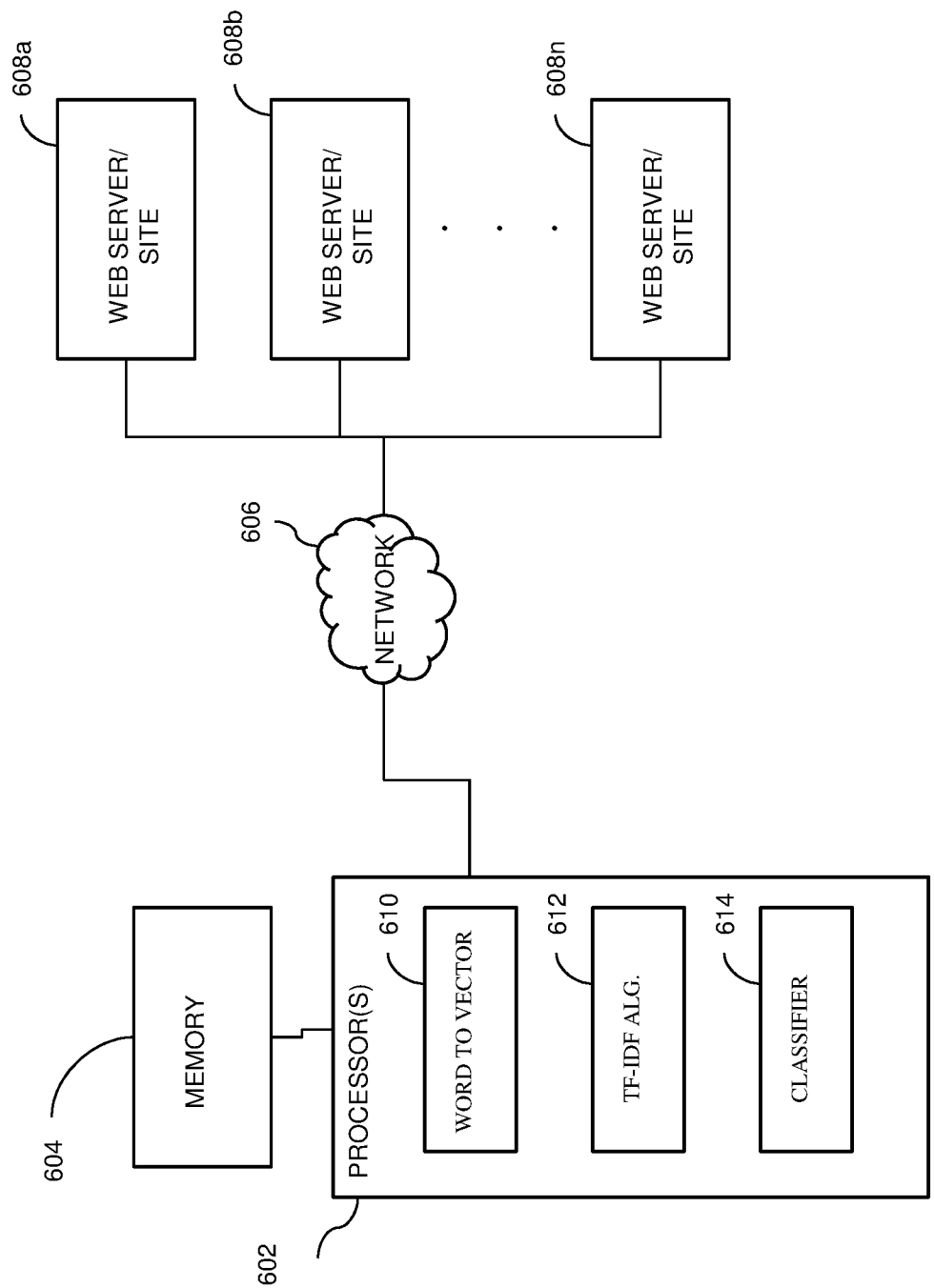
FIG. 6 is a diagram showing components of a system in one embodiment of the present disclosure.

FIG. 6 is a diagram showing components of a system in one embodiment. A hardware processor 602 may be coupled with a memory device 604. The hardware processor 602 may communicate via a communication network 606, such as the Internet, with one or more web servers providing one or more respective web sites 608a, 608b, 608n, for example, a social networking website where users or members enter comments related to various topics, for example, including comments related to one or more services provided by one or more service providers. The hardware processor 602 may extract a text document from a web site, e.g., 608a, tokenizing the text document into tokens. The hardware processor 602 may input the tokens to a word to vector conversion model 610 and run the word to vector conversion model 610 to generate word vectors. The hardware processor 602 may input the word vectors to a term frequency inverse document frequency (TF-IDF) algorithm 612 to generate sentence vectors. The hardware processor 602 may randomly select a subset of the sentence vectors for tagging with sentiment labels. The subset of the sentence vectors may be tagged, for example, by a subject matter expert or the like. The hardware processor 602 may train via machine learning a classifier 614 based on the subset of sentence vectors that are tagged. The hardware processor 602 may run the classifier with the sentence vectors as input to predict a sentiment associated with each of the sentence vectors. The hardware processor 602 may combine the predicted sentiment, e.g., associated with each of the sentence vectors to generate a sentiment associated with the text document. In one embodiment, the hardware processor 602 extracts a plurality of text documents from a plurality of websites and performs word to vector conversion, word vector to sentence vector conversion, training of the classifier and classifying the sentence vectors to sentiments, and predicting document sentiment for each of the plurality of documents. The hardware processor 602 also may perform a preprocessing of training the word to vector conversion model. In one embodiment predicting document sentiment may be performed at runtime dynamically.

Figure 7:
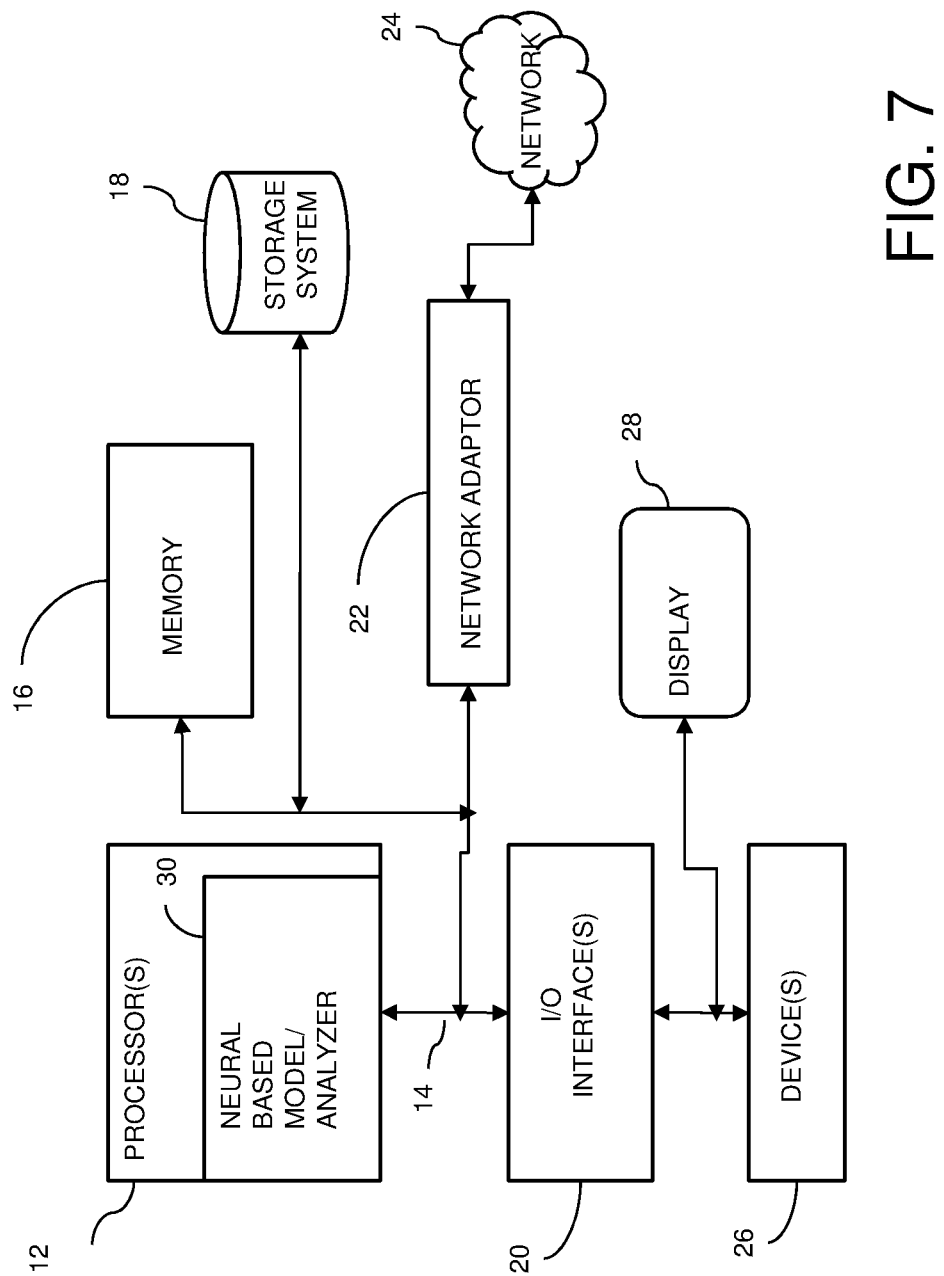
FIG. 7 illustrates a schematic of an example computer or processing system that may implement a system in one embodiment of the present disclosure.

FIG. 7 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A machine trained method of determining sentiments in social network communications, the method executed by at least one computer processor, the method comprising:
    extracting a text document from a web site;
    generating word vectors representing words in the text document by running a word to vector conversion model, a word vector representing a corresponding word in n different dimensions;
    inputting the word vectors to a term frequency inverse document frequency (TF-IDF) algorithm to generate sentence vectors, a sentence vector of a corresponding sentence generated from word vectors corresponding to words appearing in the corresponding sentence;
    running a classifier trained to predict a sentiment given an input sentence vector, with the sentence vectors as input to predict a sentiment associated with each of the sentence vectors; and
    combining the predicted sentiment associated with said each of the sentence vectors to generate a sentiment associated with the text document.

2. The method of claim 1, wherein the extracting includes at least extracting a plurality of text documents from a plurality of web sites, and the generating, the inputting of the word vectors, the running and the combining are performed for each of the plurality of text documents.

3. The method of claim 2, the method further comprising mapping said each of the plurality of text documents to at least one service provided by a service provider, and combining sentiments of the plurality of text documents that mapped to a service to determine a service sentiment associated with the service.

4. The method of claim 3, wherein the mapping further comprises partitioning the text document into a plurality of paragraphs, and identifying a number of paragraphs in which a word associated with the service appears, and responsive to determining that a number of paragraphs divided by a total number of paragraphs in the text document is below a threshold, determining that the text document is irrelevant to the service.

5. The method of claim 3, wherein the service sentiment indicates at least one of positive, neutral and negative.

6. The method of claim 1, wherein the word to vector conversion model is trained based on input text corpus and a parameter that specifies a number of dimensions.

7. A system comprising:
    a hardware processor;
    the hardware processor operatively coupled with a memory device;
    the hardware processor operable to perform at least:
        extracting a text document from a web site;
        generating word vectors representing words in the text document by running a word to vector conversion model, a word vector representing a corresponding word in n different dimensions;
        inputting the word vectors to a term frequency inverse document frequency (TF-IDF) algorithm to generate sentence vectors, a sentence vector of a corresponding sentence generated from word vectors corresponding to words appearing in the corresponding sentence;
        running a classifier trained to predict a sentiment given an input sentence vector, with the sentence vectors as input to predict a sentiment associated with each of the sentence vectors; and
        combining the predicted sentiment associated with said each of the sentence vectors to generate a sentiment associated with the text document.

8. The system of claim 7, wherein the extracting includes at least extracting a plurality of text documents from a plurality of web sites, and the generating, the inputting of the word vectors, the running and the combining are performed for each of the plurality of text documents.

9. The system of claim 8, the method further comprising mapping said each of the plurality of text documents to at least one service provided by a service provider, and combining sentiments of the plurality of text documents that mapped to a service to determine a service sentiment associated with the service.

10. The system of claim 9, wherein the mapping further comprises partitioning the text document into a plurality of paragraphs, and identifying a number of paragraphs in which a word associated with the service appears, and responsive to determining that a number of paragraphs divided by a total number of paragraphs in the text document is below a threshold, determining that the text document is irrelevant to the service.

11. The system of claim 9, wherein the service sentiment indicates at least one of positive, neutral and negative.

12. The system of claim 7, wherein the word to vector conversion model is trained based on input text corpus and a parameter that specifies a number of dimensions.

13. A computer program product comprising a computer readable storage medium having program instructions embodied therewith, the program instructions executable by a device to cause the device to:
- extract a text document from a web site;
- generate word vectors representing words in the text document by running a word to vector conversion model, a word vector representing a corresponding word in n different dimensions;
- input the word vectors to a term frequency inverse document frequency (TF-IDF) algorithm to generate sentence vectors, a sentence vector of a corresponding sentence generated from word vectors corresponding to words appearing in the corresponding sentence;
- run a classifier trained to predict a sentiment given an input sentence vector, with the sentence vectors as input to predict a sentiment associated with each of the sentence vectors; and
- combine the predicted sentiment associated with said each of the sentence vectors to generate a sentiment associated with the text document.

14. The computer program product of claim 13, wherein the device is caused to extract a plurality of text documents from a plurality of web sites, and perform the generating, the inputting of the word vectors, the running and the combining for each of the plurality of text documents.

15. The computer program product of claim 14, wherein the device is further caused to map said each of the plurality of text documents to at least one service provided by a service provider, and combine sentiments of the plurality of text documents that mapped to a service to determine a service sentiment associated with the service.

16. The computer program product of claim 15, wherein the device is further caused to partition the text document into a plurality of paragraphs, and identify a number of paragraphs in which a word associated with the service appears, and responsive to determining that a number of paragraphs divided by a total number of paragraphs in the text document is below a threshold, determine that the text document is irrelevant to the service.

17. The computer program product of claim 15, wherein the service sentiment indicates at least one of positive, neutral and negative.

18. The computer program product of claim 13, wherein the word to vector conversion model is trained based on input text corpus and a parameter that specifies a number of dimensions.

\* \* \* \* \*